United States Patent [19]

Di Matteo et al.

[11] 4,187,011

[45] Feb. 5, 1980

[54] ARRANGEMENT FOR APPLYING CODED ILLUMINATED PATTERNS TO AN OBJECT

[75] Inventors: Paul L. Di Matteo, Melville; Joseph A. Ross, Fort Salonga; Howard K. Stern, Greenlawn; Lawrence Waszak, Coram, all of N.Y.

[73] Assignee: Solid Photography Inc., Melville, N.Y.

[21] Appl. No.: 903,769

[22] Filed: May 8, 1978

Related U.S. Application Data

[63] Continuation-in-part of Ser. No. 608,265, Aug. 27, 1975.

[51] Int. Cl.² ............... G03B 21/02; G01B 11/24
[52] U.S. Cl. ............... 353/122; 353/30; 353/94; 356/376
[58] Field of Search ............... 356/2, 376, 171, 156, 356/157; 250/558; 353/28, 122, 94, 30, 37; 33/1 R

[56] References Cited

U.S. PATENT DOCUMENTS

| 891,013 | 6/1903 | Smith | 33/1 R |
|---|---|---|---|
| 1,382,978 | 6/1921 | Hopkins | 33/1 R |
| 3,318,855 | 5/1967 | Kott | 353/37 |
| 3,472,587 | 10/1969 | Liguori | 353/37 |
| 3,866,052 | 2/1975 | Di Matteo et al. | 250/558 |
| 3,988,059 | 10/1976 | Johnson | 353/122 |

*Primary Examiner*—John W. Shepperd
*Attorney, Agent, or Firm*—Max Fogiel

[57] ABSTRACT

A plurality of projectors are positioned in spaced relationship about an object with a surface to be geometrically analyzed. The projectors have cooperating masks which project onto the object illuminated patterns that subdivide the object into predetermined sections. Each mask has a predetermined pattern of sections, and is applied in sequence. The masks are cooperatively illuminated in the projectors, with a separate pattern prevailing on the object each time that a separate mask is illuminated. The combinations of the patterns on the masks define closely-spaced sections subdividing the object. The patterns are coded so that each section is uniquely defined in coded form. Cameras having the entire object within their field of view, photograph the object each time a separate mask is illuminated. The patterns or sections are generated by parallel lines projected through a mask onto the object.

12 Claims, 10 Drawing Figures

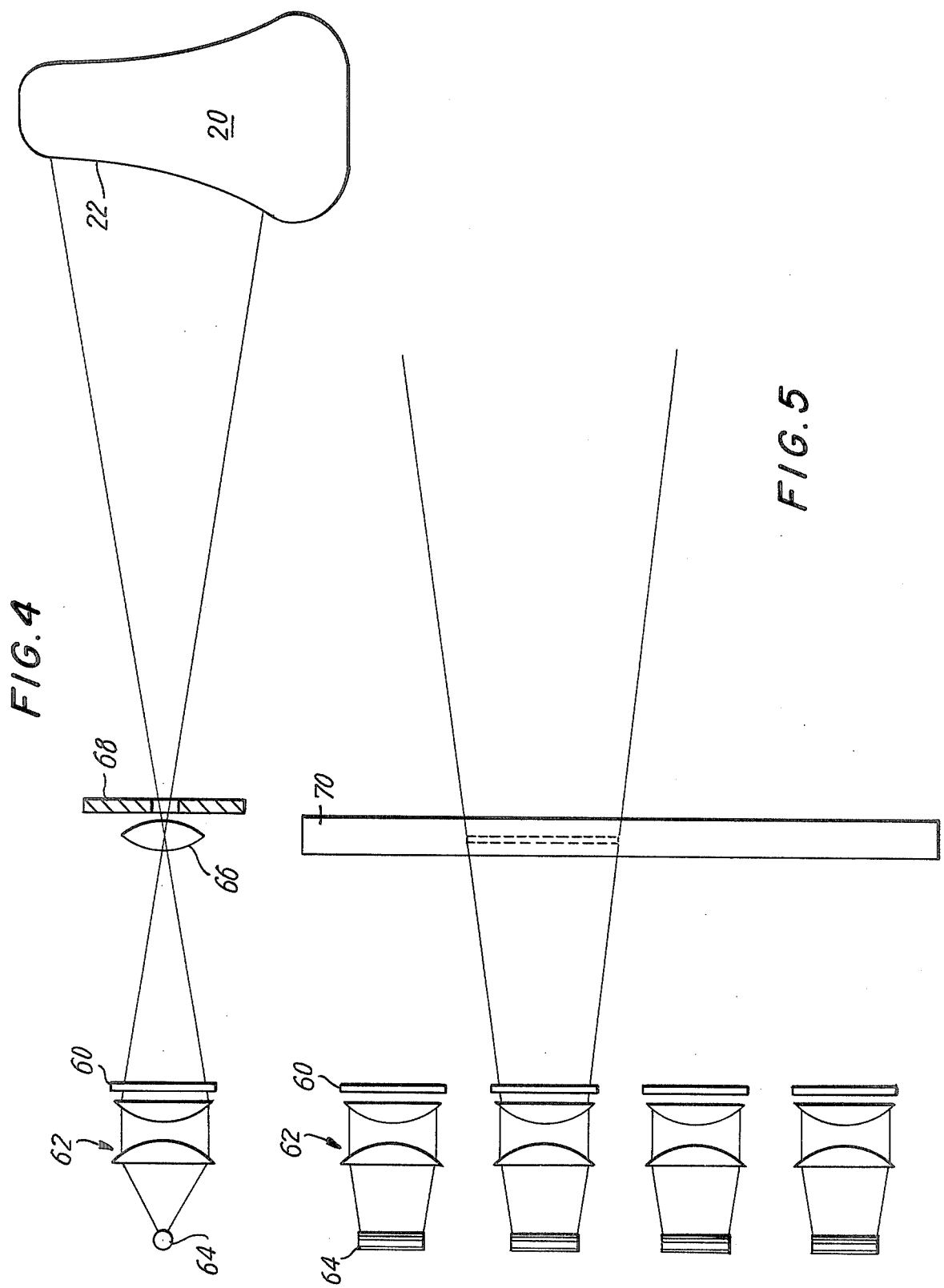

ARRANGEMENT FOR APPLYING CODED ILLUMINATED PATTERNS TO AN OBJECT

BACKGROUND OF THE INVENTION

The present application is a Continuation-in-Part of the patent application Ser. No. 608,265 filed Aug. 27, 1975.

In the reproduction or fabrication of objects with complex surfaces, it is often essential to determine the spatial locations of points on the surface. In order to reproduce or fabricate a surface with substantial precision, it is necessary to specify a substantially large number of closely-spaced points.

Heretofore, the measurements of points on a complex surface was carried out in a laborious manner by recording the positions of the points methodically until the surface has been specified with the required amount of precision. The taking of measurements of the points on the surface often involved making contact with the surface with an instrument, for example. The final amount of recorded data, furthermore, was voluminous and difficult to analyze. In view of the large amount of data which had to be recorded with respect to a large number of points in order to achieve a predetermined precision, it was particularly susceptible to the introduction of measuring and recording errors.

Accordingly, it is an object of the present invention to provide an arrangement in which an object is subdivided into a substantially large number of sections, so that points on the surface of the object may have their positions determined with substantially high resolution.

Another object of the present invention is to provide an arrangement in which each of the subdivided sections of the object is assigned a predetermined code which defines the section uniquely from the other sections.

A further object of the present invention is to provide an arrangement of the foregoing character in which the object is subdivided into sections with a minimum number of stationary masks applied to achieve a predetermined resolution of sections and accompanying precision.

A still further object of the present invention is to provide an arrangement, as described, in which the spatial positions of points within each section may be determined by correlating the points to a reference surface photographed by cameras in cooperation with the projectors and masks.

A particular object of the present invention is to project onto the surface, parallel lines which have sharply defined borders and are parallel with a substantially high degree of precision.

SUMMARY OF THE INVENTION

The objects of the present invention are achieved by arranging a plurality of projectors with stationary masks about the object with the surface to be geometrically analyzed. Each projector projects a light beam passing through a respective mask and applies a projected pattern onto the object, which subdivides the object into predetermined sections. For each mask that is applied, the projector illuminates preselected sections of the object. The illuminated and non-illuminated sections combine to form a predetermined pattern corresponding to an assigned code. The masks are illuminated in the projector in sequence, and produce a separate pattern of illumination on the object for each applied mask. The different patterns, when taken in combination subdivide the object into a substantially large number of sections, in accordance with a predetermined digital code. The code is selected, in accordance with the present invention, so that a large number of subdivided sections are obtained for a relatively few number of masks or projected patterns on the object.

Each pattern of sections associated with a mask, is photographed by cooperating cameras which have the entire surface within their field of view. The photographs taken by the cameras are correlated to photographs taken similarly of a reference object to establish the spatial locations of points on the surface of the object.

The projectors spaced about the object with the surface to be analyzed, have cooperating masks so that the illuminated pattern from one projector cooperates correspondingly with the illuminated pattern of the remaining projectors. The plurality of projectors positioned about the object, serve to cover the entire surface of the object.

Selective illumination of the surface by the projectors may be carried out by any one of various forms of electromagnetic radiation available, and the subdivision of the object into sections may be carried out along advantageous axes.

An optical focusing and aperture arrangement is provided so that sharply defined parallel lines are projected onto the surface of the object with a fan or divergent beam.

The novel features which are considered as characteristic for the invention are set forth in particular in the appended claims. The invention itself, however, both as to its construction and method of operation, together with additional objects and advantages thereof, will be best understood from the following description of specific embodiments, when read in connection with the accompanying drawings.

BRIEF DESCRIPTION OF THE DRAWINGS

FIG. 4 is a schematic view and shows the application of a fan beam for applying a coded pattern to an object surface;

FIG. 5 is a schematic view and shows an arrangement in which a single cylindrical projection lens is used in conjunction with a multiple number of illuminating sources;

DESCRIPTION OF THE PREFERRED EMBODIMENTS

Figure 1:
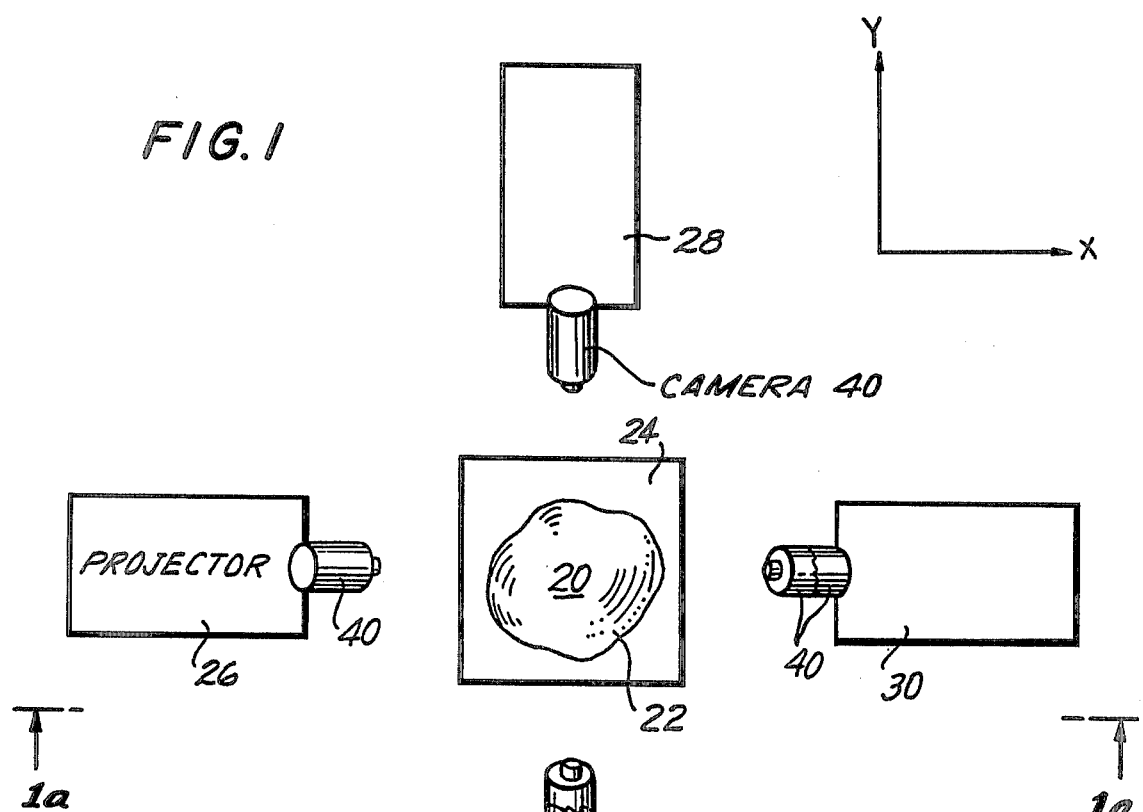
FIG. 1 is a schematic plan view and shows the relative arrangement of the surface to be analyzed or investigated, the projectors, and the cameras, in accordance with the present invention.
Figure 1A:
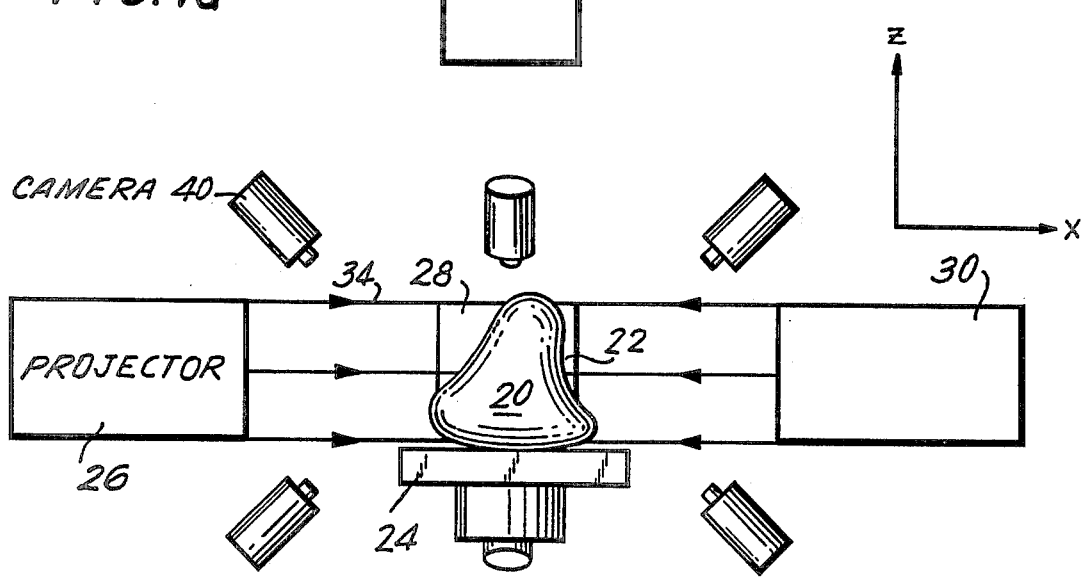
FIG. 1a is a schematic elevational view taken along line 1a—1a in FIG. 1.

Referring now to the drawing and in particular to FIG. 1, an object 20 with surface 22 to be geometrically analyzed, is placed on a support 24. Projectors 26, 28, 30, 32 are positioned in spaced relationship about the object 20 for the purpose of covering the entire surface of the object or a predetermined portion thereof. Each projector applies an illuminating beam 34 to the object 20. In the paths of the illuminating beams, are masks 36 which may be illuminated sequence in the projectors.

During the period of time that a particular mask is illuminated in a projector, preselected portions of the surface 22 are illuminated by the illuminating beam passing through the mask. The illumination of the preselected sections is carried out on the basis that the surface 22 is to be subdivided into a substantially large number of sections for a relatively few number of masks. Thus, a relatively few number of masks or illuminating patterns used in conjunction with the projector, provide sufficient data for subdividing the surface 22 into a substantially large number of sections or intervals to obtain sections of high resolution. When the projectors 26, 28, 30 and 32 are operated cooperatively, all projectors apply identical masks having identical patterns thereon. This arrangement permits covering the surface of the object and avoids shadow effects which may arise when using only a single projector.

The relationship between the number of masks 36 used in conjunction with a projector, and the number of subdivided sections of the surface 22 is obtained in the following manner.

Figure 2:
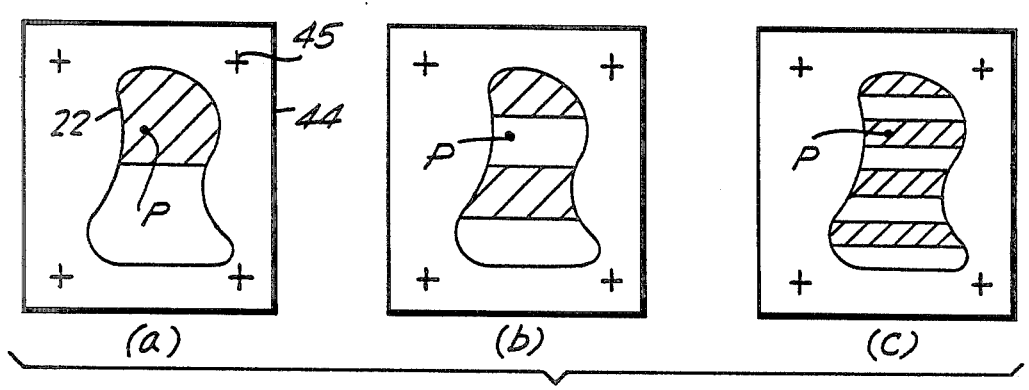
FIG. 2 shows plan views of typical photographs taken by a camera in the arrangement of FIG. 1.
Figure 3:
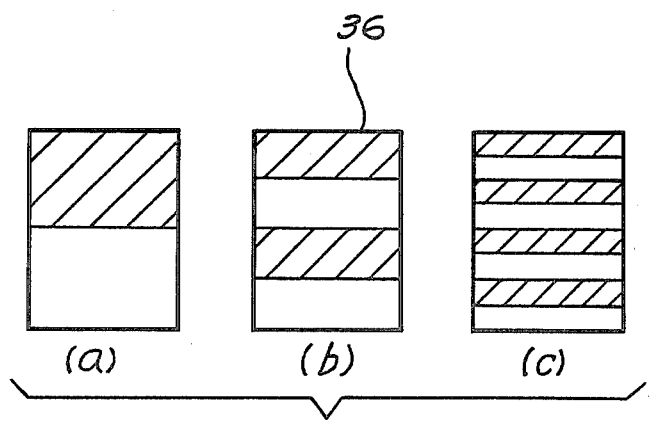
FIG. 3 is a partial plan view of a sequence of coding masks in the projectors of FIG. 1, corresponding to the photographs of FIG. 2.

If the surface 22 is to be subdivided into N sections corresponding to a predetermined precision of resolution, then this quantity N may be expressed by the series of binary terms $N = 2^0 + 2^1 + 2^2 + 2^3 + 2^4 \ldots$ From this series of binary terms, it may be seen that a substantially large number N may be obtained for a relatively few terms present in the sequence. To apply this principle to the present invention, each binary term in the sequence is made to correspond to a single mask pattern projected on the surface 22. For each mask, a predetermined pattern of illumination is applied, corresponding to the particular binary term involved. Thus, for the binary term $2^1$, for example, the illuminating pattern of FIG. 2a is produced. In this pattern, the surface 22 is subdivided into two sections or intervals. The illuminated section in FIG. 2 is shown in cross-hatched form. The non-illuminated section is left vacant. In a similar manner, the binary term $2^2$ is represented by the illuminating pattern of FIG. 2b. In FIG. 2b, the surface 22 is subdivided into four sections. FIG. 2c corresponds, accordingly, to the binary term $2^3$, and in this FIG. 2c, the surface 22 is subdivided into eight sections or intervals.

Each illuminating pattern as represented by FIGS. 2a, 2b, and 2c, for example, is photographed by cameras 40 which have the entire surface 22 within their field of view. Whereas only three patterns are represented in the drawing to correspond to three separate binary terms, in practice the cameras 40 photograph each pattern separately for as many binary terms as are necessary to obtain the quantity N. For each photograph taken by the cameras 40, moreover, the projectors 26, 28, 30, 32 project onto the object, a single pattern of a single mask.

The sectionalized pattern on the masks may be obtained, for example, by producing the mask with alternating sections or areas that will transmit and inhibit the transmission of light. The photographs 44 taken by the cameras 40 of the sectionalized patterns appearing on the object 20, are shown in FIG. 2.

In the use of the pure binary code to express the number N of subdivisions of the surface 22, as described above, each subdivision or band is assigned a unique code which serves to identify uniquely each band from the other remaining bands. Thus, bands numbered 5, 6 and 7 have, respectively, assigned codes 101000, 011000, and 111000. In a similar manner, every other band from the first one to the last one (band N) has a uniquely assigned binary code.

In accordance with the present invention, therefore, a relationship exists between the binary coded bands and the number of photographs 44 taken by the cameras 40. The relationship makes it possible for a relatively small number of photographs to include complete information of a substantially large number of bands. Thus, only ten photographs are required, for example, to specify completely 1,000 bands.

In the operation of the projectors and masks, in accordance with the present invention, a mask represented on a slide 60, for example, is held in front of a condensing lens 62, as shown in FIG. 4. In back of the condensing lens 62, is a source 64 which illuminates the slide 60 through the condensing lens. The rays of light are focused to a focal point at the projection lens 66 of a respective projector. The light rays emerging from the projection lens 66 form a fan beam which, when impinging on the surface 22 of the object 20, applies an illuminated coded pattern corresponding to the mask on the slide 60. An aperture may be placed in front of the projection lens to control the "F" number to obtain the desired depth of field. The aperture 68 serves to block unwanted rays which contribute to providing a blurred appearance of the illuminated pattern on the surface 22 of the object. The aperture 68 serves to reduce the areas through which the light emerging from the projection lens 66 may pass, thereby blocking the unwanted rays which contribute to blurring the image.

To illuminate the surface 22 of the object with a sequence of coded patterns provided by separate masks, a plurality of such masks on slides 60, for example, can be positioned within the projector, in accordance with the arrangement of FIG. 5. In back of each slide 60 there are located a condensing lens 62 and a source 64. As shown in FIG. 5, separate condensing lenses and sources of light are provided for each of the slides. Furthermore, each slide 60 has on it a separate coded pattern of parallel bands to be applied to the surface of the object. A cylindrical projections lens 70 is positioned in front of the slides 60, and has a height corresponding to the total height occupied by the combined slides. Thus, the cylindrical projection lens has a sufficient height dimension, for example, so that when any one of the slides 60 are illuminated in the arrangement of FIG. 5, light emerging from the slide will pass through the cylindrical projection lens 70. The cylindrical lens 70 serves to define sharply the border lines between bands in only one direction of the mask. For example, if the bands on the mask are all horizontal for the purpose of subdividing the object surface 22 into a sequence of parallel planes having horizontal border lines, then it is necessary to provide for sharply defined horizontal border lines only. It is not necessary to provide for sharply defined vertical lines which might constitute the ends of the bands as they intersect the vertical sides of the mask, for example. For purposes of subdividing the object surface 22 into horizontal bands, therefore, it is not necessary to provide for sharp definition along the vertical axis. As a result, since only sharp definition is required along horizontal lines, a cylindrical projection lens may be used rather than a spherical lens, which would provide for sharp definition in both horizontal and vertical directions. Similarly, the light source 64 may also be a cylindrical source or a bar-shaped source, rather than being a point source or a spherical source.

Figure 7:
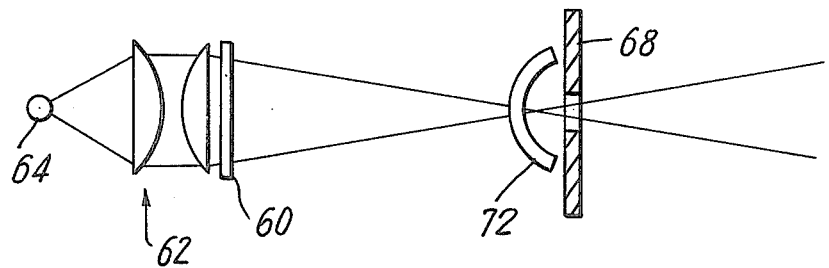
FIG. 7 is a schematic side view of the arrangement of FIG. 6.
Figure 6:
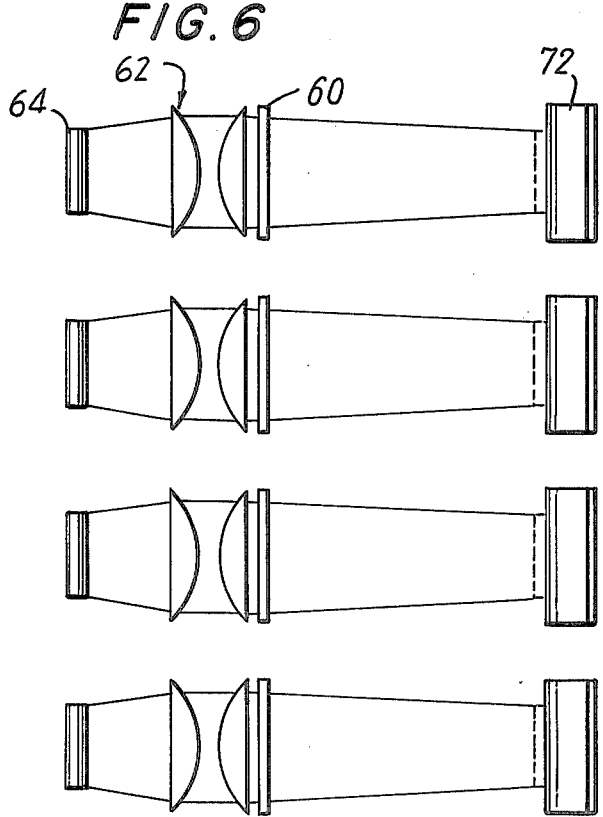
FIG. 6 is a schematic view and shows another embodiment of the arrangement of FIG. 5 when using a separate projection lens with each source and mask.

In accordance with another embodiment of the present invention, the single cylindrical projection lens 70 may be replaced with a multiple number of projection lenses 72, each of which consists of either a spherical or an anamorphic optical system. Each projection lens is used in conjunction with only one slide, as shown in FIG. 6. Furthermore, in front of each projection lens 72, there may be mounted an aperture 68 which serves the functions, already described. FIG. 7 is a side view of the arrangement of FIG. 6.

Whereas, FIG. 4, shows the projection of a fan beam when using a conventional projection lens, but adding an aperture 68 for controlling the "F" number, the arrangement of FIG. 5 does not use a projection lens with a conventional spherical system. Instead, the arrangement of FIG. 5 provides for a cylindrical system of lens surfaces. The slide which is to be projected, is selected by illuminating only the source behind the slide carrying the mask which is to be applied to the object surface. Thus, by selectively turning on the multiple sources 64 in FIG. 5, selective fan beam patterns may be projected without requiring to move the slides physically. Since neither horizontal imaging or horizontal depth of field are required, as already described, the cylindrical element allows decreasing the horizontal "F" number and thereby allows for increased light coupling from source to field. Furthermore, the illuminating sources 64 are placed behind the condenser system in such a way, that the horizontal fields overlap each other maximally.

Figure 8:
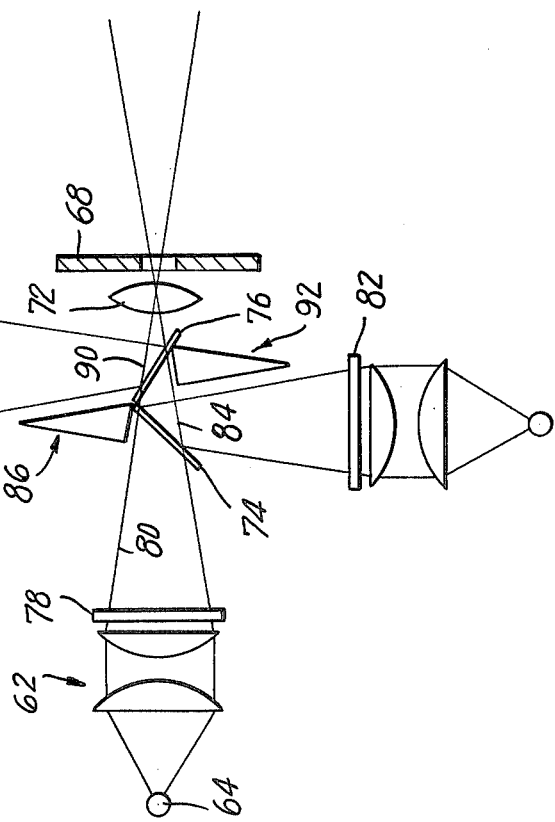
FIG. 8 is a schematic view and shows an arrangement using beam splitters for mounting multiple sources and masks within a compact unit.

In another embodiment of the present invention, as shown in FIG. 8, beam splitters 74 are used to obtain a compact arrangement when using a multiple number of projection slides. The arrangement of FIG. 8, allows the number of projected slides to be increased, for example, without increasing the horizontal overall width of the projector. Thus, by locating beam splitters 74 and 76 as shown in FIG. 8, light emerging from the slide 78, will be transmitted to the projection lens 72 by the light beam shown by the envelope or outline 80. Another slide 82 will have its pattern transmitted to the projection lens 72, as a result of reflections from the beam splitter 74, which are shown by the envelope or outline 84. The cone-shaped member 86 serves as a light trap for the unwanted light rays passing through the beam splitter 74. Similarly, a slide 88 is reflected by the beam splitter, so that the light emerging from the mask on the slide 88 is transmitted to the projection lens 72 by the beam represented by the envelope or outline 90. The member 92 serves as a light trap for unwanted light rays, similar to the light trap 86 described above.

Figure 9:
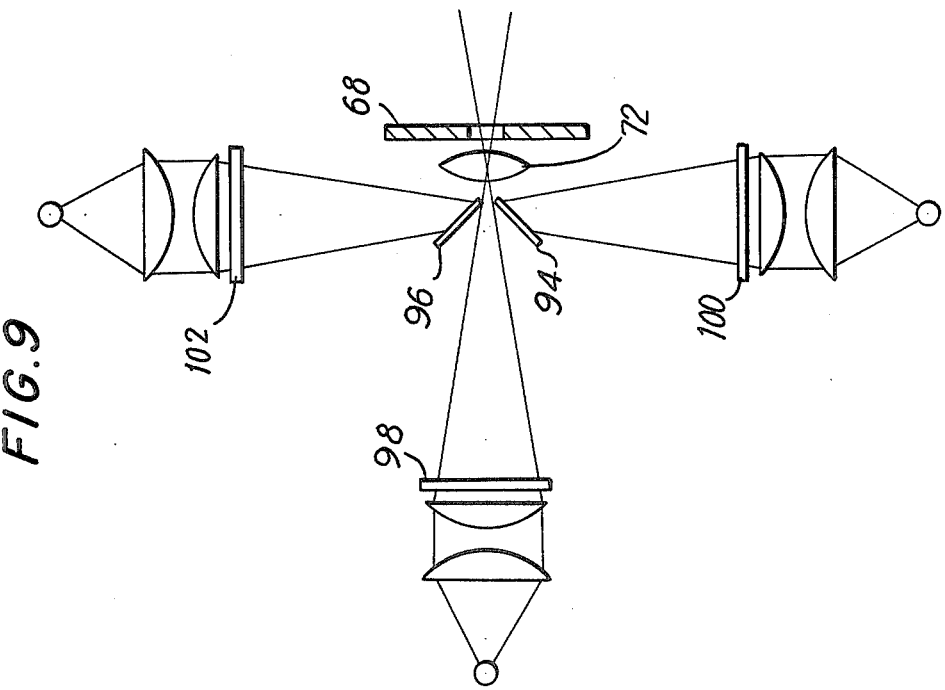
FIG. 9 is a schematic view of another embodiment of FIG. 8 when using mirrors.

In a further embodiment of the present invention, mirrors are used to combine the ray bundles from sets of slides to allow for increasing the total number of slides without increasing substantially the overall width of the projector. As shown in FIG. 9, mirrors 94, 96 are positioned to allow light passing through a slide 98, to be transmitted between the mirrors 94 and 96 and to impinge on the projector lens 72. Light from another slide 100, on the other hand, is reflected by the mirror 94 so that the reflected beam is also applied to the projection lens 72. In a similar manner, light from a further slide 102 is reflected by the mirror 96 and transmitted to the projection lens 72. An aperture 68 may be used in conjunction with the system for purposes of controlling the "F" number, as already described.

Whereas the sources 64 may apply energy rays to the respective slides 60, which are in the visible spectrum, other energy rays may be used in the electromagnetic spectrum for this purpose, such as infrared, for example.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for projecting a sequence of coded patterns onto an object surface, comprising: a plurality of stationary masks each carrying a predetermined coded pattern of at least one line for forming parallel bands to be projected in sequence, the coded pattern being projected onto the object surface by passing electromagnetic radiation through the mask; a plurality of sources of electromagnetic radiation for irradiating said masks, each mask having a separate associated source of electromagnetic radiation; and cylindrical projection lens means for defining sharply boarded lines between bands in substantially only one direction and being located between said mask and said object surface for receiving energy rays from said masks as selected in sequence by operating the source associated with the mask selected and projecting the energy rays from the masks onto said object surface; coded patterns being selectively projected in sequence onto said object surface by operating selectively in sequence said sources of electromagnetic radiation.

2. An arrangement as defined in claim 1 wherein said cylindrical projection lens means comprises a plurality of cylindrical projection lenses, each cylindrical projection lens projecting only the image of one separate mask.

3. An arrangement as defined in claim 1 including aperture means in front of said cylindrical projection lens means for controlling the depth of field.

4. An arrangement as defined in claim 1 including beam splitter means between said masks and said projection lens means, said plurality of sources being non-colinear for arranging said sources in combination with said masks projecting lens means and beam splitter means is a predetermined compact unit.

5. An arrangement as defined in claim 1 including mirror means between said masks and said projection lens means for reflecting energy rays from at least one mask, said sources being non-colinear to arrange said sources in combination with said masks and said projection lens means as well as said mirror means into a predetermined compact unit.

6. An arrangement as defined in claim 1 including condensing lens means between said sources and said masks.

7. An arrangement as defined in claim 6 wherein said condensing lens means comprises a plurality of condensing lens units, each unit being associated with a separate one of said masks and being positioned separately between said one mask and the respective source.

8. An arrangement as defined in claim 1 wherein said electromagnetic radiation is within the visible spectrum.

9. An arrangement as defined in claim 1 wherein said sources of electromagnetic radiation comprise elongated cylindrical sources.

10. An arrangement as defined in claim 1 wherein the energy rays transmitted by said projection lens means form a fan-shaped beam.

11. An arrangement as defined in claim 1 wherein said cylindrical projection lens means comprises a single projection lens operating with a plurality of masks, each mask having a single associated condenser lens and a source of electromagnetic radiation.

12. An arrangement as defined in claim 1 wherein said cylindrical projection lens means comprises a single lens operating with a plurality of masks; aperture means in front of said cylindrical projection lens means for controlling the depth of field; beam splitter means between said masks and said projection lens means, said plurality of sources being non-colinear for arranging said sources in combination with said masks, projecting lens means and beam splitter means in a predetermined compact unit; mirror means between said masks and said projection lens means for reflecting energy rays from at least one mask; condensing lens means between said sources and said masks, said condensing lens means comprising a plurality of condensing lens units, each unit being associated with a separate one of said masks and being positioned separately between said one mask and the respective source; said electromagnetic radiation being within the visible spectrum; said sources of electromagnetic radiation comprising elongated cylindrical sources; the energy rays transmitted by said projection lens means forming a fan-shaped beam.

* * * * *